US012757899B2

(12) United States Patent
Güthner et al.

(10) Patent No.: US 12,757,899 B2
(45) Date of Patent: Oct. 13, 2026

(54) USE OF ACYLCYANAMIDES OR SALTS THEREOF FOR REGULATING PLANT GROWTH

(71) Applicant: Alzchem Trostberg GmbH, Trostberg (DE)

(72) Inventors: Thomas Güthner, Trostberg (DE); Hubertus Gehrmann, Feichten (DE); Martin Eberl, Niederbergkirchen (DE); Jose Martinez Ramos, Munich (DE)

(73) Assignee: Alzchem Trostberg GmbH, Trostberg (DE)

( * ) Notice: Subject to any disclaimer, the term of this patent is extended or adjusted under 35 U.S.C. 154(b) by 970 days.

(21) Appl. No.: 17/774,281

(22) PCT Filed: Nov. 4, 2020

(86) PCT No.: PCT/EP2020/080925

§ 371 (c)(1),
(2) Date: May 4, 2022

(87) PCT Pub. No.: WO2021/089601

PCT Pub. Date: May 14, 2021

(65) Prior Publication Data

US 2022/0400680 A1 Dec. 22, 2022

(30) Foreign Application Priority Data

Nov. 8, 2019 (DE) ..................... 10 2019 130 148.3

(51) Int. Cl.
*A01N 47/40* (2006.01)
*A01N 25/04* (2006.01)

(52) U.S. Cl.
CPC ............. *A01N 47/40* (2013.01); *A01N 25/04* (2013.01)

(58) Field of Classification Search
CPC ................................ A01N 47/40; A01N 25/04
See application file for complete search history.

(56) References Cited

U.S. PATENT DOCUMENTS

| | | | |
|---|---|---|---|
| 4,487,625 A | 12/1984 | Rieder |
| 4,569,782 A | 2/1986 | Disch et al. |
| 4,595,782 A | 6/1986 | Hase et al. |
| 9,894,901 B2 | 2/2018 | Mukumoto et al. |
| 2017/0064944 A1 | 3/2017 | Güthner |

FOREIGN PATENT DOCUMENTS

| | | | |
|---|---|---|---|
| DE | 708428 C | 7/1941 |
| DE | 1907193 A1 | 6/1971 |
| DE | 3003437 A1 | 8/1981 |
| DE | 3031636 A1 | 4/1982 |
| DE | 3150404 A1 | 6/1983 |
| DE | 3202213 A1 | 8/1983 |
| DE | 3203493 A1 | 8/1983 |
| DE | 3640879 A1 | 6/1988 |
| DE | 3827449 A1 | 2/1990 |
| DE | 4004379 A1 | 8/1991 |
| DE | 102014003082 A1 | 9/2015 |
| DE | 2757586 A1 | 6/2021 |
| WO | 8704348 A1 | 7/1987 |
| WO | 2014122066 A1 | 8/2014 |
| WO | 2014073622 A1 | 9/2016 |
| ZA | 832332 B | 11/1983 |

OTHER PUBLICATIONS

German Application No. DE102019130148.3 , Search Report mailed Jul. 8, 2020, 6 pages.
Kwon et al., “Intermolecular Decomposition of N-Acylcyanamides”, Journal of Organic Chemistry, vol. 55, No. 10, 1990, pp. 3403-3406.
International Application No. PCT/EP2020/080925, International Search Report and Written Opinion mailed Feb. 18, 2021, 19 pages.
C.C. Nee, “Breaking dormancy in kiwifruit with chilling or chemical treatments”, New Zealand Journal of Crop and Horticultural Science, 19:4, 1991, pp. 419-421.
Siller-Cepeda et al., “Hydrogen Cyanamide-induced Budbreak and Phytotoxicity in ‘Redhaven’ Peach Buds” Hortscience 27(8), 1992, pp. 874-876.
Mertschenk et al., “Urinary Excretion of Acetylcyanamide in Rat and Human After Oral and Dermal Application of Hydrogen Cyanamide (H2NCN)”, Archives of Toxicology, vol. 65, No. 4, 1991, pp. 268-272.
Shirota et al., “N-Acetylcyanamide, the Major Urinary Metabolite of Cyanamide in Rat, Rabbit, Dog, and Man”, Drug Metabolism and Disposition: the Biological Fate of Chemicals, vol. 12, No. 3, May-Jun. 1984, pp. 337-344.
Shulman et al., “The Effect of Cyanamide on the Release From Dormancy of Grapevine Buds”, Scientia Horticulturae, vol. 19, No. 1-2, Mar. 1983, pp. 97-104.
International Application No. PCT/EP2020/080925, International Preliminary Report on Patentability mailed May 10, 2022, 11 pages.
Spiegel-Roy et al., “Effect of Cyanamide in Overcoming Grape Seed Dormancy”, HortScience, vol. 22, No. 2, Apr. 1987, pp. 208-210.
Wehrstedt et al., “Safe Transport of Cyanamide”, Journal of Hazardous Materials, vol. 170, 2009, pp. 829-835.
Inoue et al., “Studies on the control of barnyardgrass by dormancy awakening (Part 2)* Regarding the induction of dormancy awakening by respiratory inhibition”, Japanese Journal of Soil Science and Plant Nutrition, 1971, vol. 42, No. 4, pp. 157-162, with English translation 18 pages.
Eberl, “Comparison of the Acute Toxicity of Acetyl-, Formyl- and Propionylcyanamide”, BSL Bioservice Scientific Laboratories Munich GmbH, Behringstr. 6/8, 82152 Planegg/Munich, 71761PUS-WO/MDcna, Jul. 2, 2019, 2 pages.
SKW Trostberg AG, “Machine Translation of Publication DE 2757586 A1”, Jun. 28, 1979, 8 pages.

*Primary Examiner* — Ali Soroush
*Assistant Examiner* — Andriae M Holt
(74) *Attorney, Agent, or Firm* — Kilpatrick Townsend & Stockton LLP

(57) ABSTRACT

The present invention relates to the use of acyl cyanamides or salts thereof as an active ingredient of plant growth regulators, in particular for breaking the dormancy of fruit trees.

7 Claims, No Drawings

USE OF ACYLCYANAMIDES OR SALTS THEREOF FOR REGULATING PLANT GROWTH

CROSS REFERENCE TO RELATED APPLICATION

This application is a U.S. national phase of International Patent Application No. PCT/EP2020/080925 filed on Nov. 4, 2020, which claims priority to German Patent Application No. 10 2019 130 148.3, filed in Germany on Nov. 8, 2019. The entire contents of both applications are hereby incorporated herein by this reference.

The present invention relates to the use of acyl cyanamides or salts thereof as an active ingredient of plant growth regulators, in particular for breaking the dormancy of fruit trees.

Plant growth regulators are active ingredients that specifically influence the growth, development and metabolic processes of crops and cultivated plants even when applied in the smallest doses. The term plant growth regulator includes both natural phytohormones and synthetic substances. Plant growth regulators are used in agricultural plant production to reduce or prevent negative effects of numerous environmental factors or to enhance positive effects. The use of plant growth regulators can thus increase the yield potential of crops and cultivated plants, exploit site factors to a greater extent and ensure the effectiveness of intensification measures.

Dormancy is a term for a dormant period in the developmental and life cycle of plants, which may extend to buds and seeds and is characterized by the non-growth of plants. Dormancy can be abolished or broken by light, temperature, or moisture. For example, the so-called breaking of dormancy is induced in a number of seeds by species-specific cold periods ("stratification"). In a similar way, namely by the influence of cold or frost, bud dormancy is also terminated, whereby in both cases concentration changes of the phytohormones abscisic acid, auxins and gibberellins can be observed. These natural dormancy periods are of plant-physiological importance, because premature budding in case of subsequent cold periods can lead to freezing and possible death of newly formed plant parts.

Breaking of dormancy, especially bud dormancy, can also be induced by the influence of plant growth regulators applied to plants by topical application. Cyanamide, for example, has been known for some time as an active ingredient for dormancy breaking, especially in fresh fruit. Corresponding applications have been described, for example, in DE 3150404 and ZA 8302332. Further descriptions of the use of cyanamide-containing spray mixtures for breaking dormancy can be found, for example, in:

Table grapes: Y. Shulman et. al, Scientia Horticulturae (1983), 19, 97, P. Spiegel-Roy et. al, HortScience (1987), 22, 208, Kiwifruit: C. C. Nee, New Zealand Journal of Crop and Horticultural Science (1991), 19, 419, Peach: J. H. Siller-Cepeda, HortScience (1992), 27, 874.

Artificial dormancy breaking, initiated by the application of suitable active ingredients, is particularly economically valuable for shifting harvesting to an earlier than natural time, as higher prices can then be obtained for the fruit. For the cultivation of plants (e.g. grapes or cherries) in tropical regions, artificial breaking of dormancy and thus an intentional and at a calculated point in time triggered sprout of the buds is even indispensable, since these plants would hardly sprout naturally and only very unevenly in a tropical environment. In this respect, treatment with dormancy-breaking agents is indispensable for growing table grapes or cherries in tropical mountain regions, for example, and thus to supply the world market off-season in temperate latitudes in the northern or southern hemisphere.

Cyanamide for use as a spray mixture for dormancy breaking is usually marketed as an aqueous solution, e.g. with a cyanamide content of 50% and possibly further additives, such as stabilizers, dyes or surfactants. Alternatively, an organic oil-containing concentrate based on cyanamide was described in DE 102014003082 A1, which exhibits an improved dormancy-breaking effect after dilution with water.

In addition to the desired dormancy-breaking effect in plants, cyanamide unfortunately also has a variety of physiological effects on animals and humans. For example, cyanamide is classified as highly corrosive (skin-destroying), acutely toxic and teratogenic. Further investigations have shown that special occupational safety measures must be observed when cyanamide or cyanamide-containing solutions are used in agricultural applications.

Cyanamide is also a polymerizable substance that can only be transported and stored under special precautions (cf. K.-D. Wehrstedt et. al., Journal of Hazardous Materials 170 (2009) 829-835). Concentrates for the preparation of a cyanamide-containing spray mixture are already subject to degradation or dimerization with the formation of cyanoguanidine at normal storage temperatures, so that only a time-limited effectiveness is given.

The present invention is therefore based on the object of providing an agricultural agent for regulating plant growth which is largely safe for the user, which can be classified as safe on the basis of its ingredients and which can be assessed as efficient in terms of its effect.

These problems are solved by a use as described herein, a concentrate as described herein, as well as a method as described herein. Preferred embodiments of the invention are indicated in the dependent claims, which may optionally be combined with each other.

Thus, a first embodiment of the present invention is the use of at least one compound from the group of the acylcyanamides or a salt thereof according to formula (I) or formula (II) for regulating the generative growth of plants, in particular the generative growth of crops and cultivated plants, preferably the generative growth of fruit trees, or for breaking the dormancy of fruit trees, wherein the following applies to formula (I) and formula (II)

Formula (I)

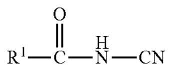

Formula (II)

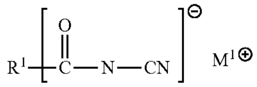

wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV)

Formula (III)

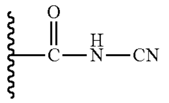

Formula (IV)

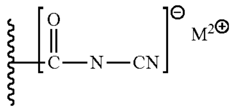

$M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl.

According to the present invention, radical $R^1$ may be hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl, arylalkyl or a radical Q, wherein Q is a radical $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, which is in turn substituted by a radical of the formula (III) or formula (IV).

In the context of the present invention, $C_1$ to $C_{20}$ alkyl is to be understood as a saturated, linear or branched aliphatic radical having a chain length of 1 to 20 carbon atoms, in particular of 1 to 8 carbon atoms, in particular an alkyl radical having the general formula $C_nH_{2n+1}$, where n=an integer from 1 to 20, preferably an integer from 1 to 12 and in particular an integer from 1 to 8. It is preferably provided that $C_1$ to $C_{20}$ alkyl, in particular means methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, 2-ethylpropyl, n-hexyl, n-heptyl, n-octyl, n-nonyl, n-decyl, n-undecyl or n-dodecyl.

According to the present invention, $C_1$ to $C_{20}$ alkyl particularly preferably means methyl, ethyl, n-propyl, 1-methylethyl, n-butyl, 1-methylpropyl, 2-methylpropyl, 1,1-dimethylethyl, n-pentyl or n-hexyl. Very preferably, $C_1$ to $C_{20}$ alkyl according to the present invention means methyl, ethyl, n-propyl, n-butyl, n-pentyl or n-hexyl.

In the context of the present invention, $C_3$ to $C_{12}$ cycloalkyl is further intended to mean a saturated, monocyclic or bicyclic aliphatic radical having 3 up to 12 carbon atoms, in particular a cycloalkyl radical, which has the general formula $C_nH_{2n-1}$ wherein n=an integer from 3 to 12. It is preferably provided that $C_3$ to $C_{12}$ cycloalkyl means in particular cyclopropyl, cyclobutyl, cyclopentyl, cyclohexyl or cycloheptyl, wherein these cycloalkyl radicals may in turn be further preferably mono- or polysubstituted by alkyl.

According to the present invention, $C_3$ to $C_{12}$ cycloalkyl particularly preferably means cyclopentyl or cyclohexyl.

Furthermore, in the context of the present invention, alkanediyl is to be understood as a saturated, linear or branched, aliphatic radical, which has two bonding sites and in particular a chain length of 1 to 20 carbon atoms ($C_1$-$C_{20}$ alkanediyl), preferably of 1 to 12 carbon atoms ($C_1$-$C_{12}$ alkanediyl), in particular of 1 to 6 carbon atoms ($C_1$-$C_6$ alkanediyl), and which in particular has the general formula $C_nH_{2n}$, wherein n=an integer from 1 to 12, in particular an integer from 1 to 6.

According to the present invention, alkanediyl particularly preferably means methanediyl, ethane-1,2-diyl, propane-1,3-diyl, butane-1,4-diyl, pentane-1,5-diyl or hexane-1,6-diyl.

Furthermore, in the context of the present invention, $C_2$ to $C_{20}$ alkenyl is to be understood as an unsaturated, linear or branched, aliphatic radical with a chain length of 2 to 20 carbon atoms with one, two, three or four double bonds, which, in particular depending on the number of double bonds, has the general formula: one double bond, $C_nH_{2n-1}$ with n=an integer from 2 to 20, two double bonds: $C_nH_{2n-3}$ with n=an integer from 4 to 20, three double bonds $C_nH_{2n-5}$ with n=an integer from 6 to 20 or four double bonds $C_nH_{2n-7}$ with n=an integer from 8 to 20. It is preferably provided that $C_2$ to $C_{20}$ alkenyl is in particular ethenyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, butadienyl, pentadienyl, hexadienyl, heptadienyl, octadienyl, nonadienyl, decadienyl, hexatrienyl, heptatrienyl, octatrienyl, nonatrienyl or decatrienyl, wherein these alkenyl radicals may furthermore preferably be unbranched or in turn mono- or polysubstituted by alkyl.

According to the present invention, $C_2$ to $C_{20}$ alkenyl particularly preferably means heptenyl, octenyl, nonenyl, decenyl, undecenyl, dodecenyl, tridecenyl, tetradecenyl, pentadecenyl, hexadecenyl, heptadecenyl or octadecenyl. Very preferably, $C_2$ to $C_{20}$ alkenyl means tridecenyl, tetradecenyl, pentadecenyl, hexadecenyl, heptadecenyl or octadecenyl.

According to the present invention, $C_1$ to $C_{20}$ alkoxy means a radical of the formula —O— alkyl, wherein the binding site is located at the oxygen and wherein alkyl is a $C_1$ to $C_{20}$ alkyl radical of the meaning given above. Preferred is radical $R^1$ or Q $C_1$-$C_{12}$ alkoxy and more preferred $C_1$-$C_6$ alkoxy.

According to the present invention, $C_1$ to $C_{20}$ alkoxy particularly preferably means methoxy, ethoxy, n-propoxy, n-butoxy or n-pentoxy. Very preferably, $C_1$ to $C_{20}$ alkyl according to the present invention means methoxy or ethoxy.

According to the present invention, aryl means an aromatic radical, in particular an aromatic radical having 6 up to 20 carbon atoms, preferably having 6 to 10 carbon atoms, particularly preferably having 6 carbon atoms, which may be monocyclic, bicyclic or polycyclic. Thus, aryl according to the present invention can mean in particular phenyl, naphthyl, anthryl, phenantryl, pyrenyl or perylenyl.

According to the present invention, aryl particularly preferably means phenyl.

According to the present invention, arylalkyl means an alkyl radical of the meaning given above substituted with an aryl radical of the meaning given above, the binding site of the arylalkyl radical being located on the alkyl radical. Thus, arylalkyl according to the present invention may in particular mean benzyl, 1-phenylethyl or 1-methyl-1-phenylethyl.

According to the present invention, arylalkyl particularly preferably means benzyl.

According to the present invention, alkylaryl means an aryl radical of the meaning given above, which in turn is mono- or polysubstituted with an alkyl radical of the meaning given above, the binding site of the alkylaryl radical being located on the aryl radical. Thus, alkylaryl according to the present invention can in particular mean tolyl, xylyl, pseudocumyl or mesityl.

According to the present invention, alkylaryl particularly preferably means tolyl.

Surprisingly, it was shown that acylcyanamides according to the invention or their salts according to formula (I) or according to formula (II) have an effect as plant growth regulators. This fact is even more surprising since these substances have been known as such for some time (see DE 32022013). To date, however, these acyl cyanamides have only been attributed an effect as surfactants (cf. DE 708428) or as accelerators for anaerobically curing adhesives (DE 3003437). An effect in the living plant is not known. What is known is that cyanamide itself is rapidly and completely metabolized to acetylcyanamide in humans and other vertebrates and thus detoxified (cf. F. N. Shirota et. al., Drug Metabolism and Disposition (1984), 12, 337 and B. Mertschenk et. al, Archives of Toxicology (1991), 65, 268). Thus, acetylcyanamide is excreted from the organism via human urine and can thus be quantified (cf. DE 3827449). Without being bound by theory, acylcyanamides must thus have an effect in plants that is different from the detoxification mechanism in vertebrates. The fact that acylcyanamides according to the invention, in particular acetylcyanamide, are not also "detoxified" in the plant, and are thus ineffective, but have a dormancy-breaking effect, represents a completely surprising effect and the actual essence of the invention.

A dormancy-breaking effect occurs when bud burst and/or flowering of the plants occurs earlier in time compared to the natural bud burst and flowering of the plants. Thus, dormancy breaking regulates the generative growth of the plants. In this context, it is desirable that complete sprouting and flowering of the plants, in particular of crops and cultivated plants or fruit trees, takes place within a relatively short period of time, so that the further development phases of the treated plants can be predicted. According to the invention, such a dormancy-breaking effect was observed with acylcyanamides according to formula (I) or formula (II) (cf. examples).

Thus, by means of the use of acylcyanamides or their salts according to formula (I) or according to formula (II) according to the invention, the generative growth of plants, in particular the generative growth of crops and cultivated plants, preferably the generative growth of fruit trees, can be regulated, or the dormancy of fruit trees can be broken.

In addition, acylcyanamides of the present invention have a positive property for use in agriculture. Compared to cyanamide, these compounds can be considered stable in storage and largely soluble in liquids. It has also been shown that, contrary to cyanamide, these acylcyanamides are not subject to degradation and/or dimerization tendency in aqueous solutions.

Acylcyanamides of formula (I) according to the invention are weak NH acids, so they can form stable salts of formula (II) with bases. These salts have a neutral pH, are physiologically well tolerated, stable in storage and, surprisingly, are active as dormancy-breaking agents.

Acylcyanamides and their salts according to formula (I) or formula (II) are thus ideally suitable to replace cyanamide in those areas of application, in which cyanamide cannot or should not be used due to its toxicological or other properties.

In accordance with the present invention, acylcyanamides or salts thereof according to formula (I) or formula (II) may be used, which radical $R^1$ is a radical from the group consisting of hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, or a radical Q, wherein Q is a radical from the group consisting of $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV).

Preferably, such acylcyanamides or salts thereof corresponding to formula (I) or to formula (II) may be used, which radical $R^1$ is a radical from the group consisting of hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy or a radical Q, wherein Q is a radical from the group consisting of $C_1$ to $C_{20}$ alkyl, $C_3$ to $C_{12}$ cycloalkyl, $C_2$ to $C_{20}$ alkenyl, $C_1$ to $C_{20}$ alkoxy, each substituted by a radical of formula (III) or formula (IV).

Further preferably, such acylcyanamides or salts thereof corresponding to formula (I) or to formula (II) may be used, which radical $R^1$ is a radical from the group consisting of hydrogen, $C_1$ to $C_{20}$ alkyl, $C_2$ to $C_{20}$ alkenyl, $C_1$ to $C_{20}$ alkoxy or a radical Q, wherein Q is a radical from the group consisting of $C_1$ to $C_{20}$ alkyl, $C_2$ to $C_{20}$ alkenyl, $C_1$ to $C_{20}$ alkoxy, each substituted by a radical of formula (III) or formula (IV).

Even more preferably, such acylcyanamides or salts thereof of formula (I) or of formula (II) may be used, which radical $R^1$ is a radical from the group consisting of hydrogen, $C_1$ to $C_{20}$ alkyl, $C_2$ to $C_{20}$ alkenyl or a radical Q, wherein Q is a radical from the group consisting of $C_1$ to $C_{20}$ alkyl, $C_2$ to $C_{20}$ alkenyl, each substituted by a radical of formula (III) or formula (IV).

Particularly preferably, such acylcyanamides or salts thereof of formula (I) or of formula (II) may be used, which radical $R^1$ is a radical from the group consisting of hydrogen, $C_1$ to $C_{20}$ alkyl or a radical Q, wherein Q is a radical from the group consisting of $C_1$ to $C_{20}$ alkyl, substituted by a radical of formula (III) or formula (IV).

The free acids of acylcyanamides according to the invention provide solutions that have a pH similar to an acetic acid solution. Such acidic solutions are only suitable for special agricultural applications. Therefore, salts of the acylcyanamides according to formula (II) are preferred according to the present invention.

With regard to the variance of the cations, it has been shown that alkali metal salts and alkaline earth metal salts form stable salts of acylcyanamides according to the invention. Preferred are therefore those acylcyanamides or salts thereof according to formula (I) or formula (II) for which cations $M^1$ and $M^2$ independently of one another mean Li, Na, K, ½Ca or ½Mg. Further preferred are alkali metal salts. Thus $M^1$ and $M^2$ independently of one another preferably mean Li, Na or K, very particularly preferably Na or K.

Preferably, therefore, in accordance with the present invention, at least one compound selected from the group consisting of the acylcyanamides or a salt thereof according to formula (I) or formula (II) can be used to regulate the generative growth of plants, in particular the generative growth of crops and cultivated plants, preferably the generative growth of fruit trees, or for breaking the dormancy of fruit trees, wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy or a radical Q, wherein Q is:
  Q=$C_1$ to $C_{20}$ alkyl, $C_3$ to $C_{12}$ cycloalkyl, $C_2$ to $C_{20}$ alkenyl, $C_1$ to $C_{20}$ alkoxy, each substituted by a radical of formula (III) or formula (IV), $M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl.

Further preferred herein are compounds from the group of acylcyanamides or a salt thereof according to formula (I) or according to formula (II), wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_2$ to $C_{20}$ alkenyl, or $C_1$ to $C_{20}$ alkoxy, $M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl.

Further preferred herein are compounds from the group of acylcyanamides or a salt thereof according to formula (I) or according to formula (II), wherein radical $R^1$ and cations $M^1$, $M^2$ independently of one another mean:

$R^1$=hydrogen, $C_1$ to $C_{20}$ alkyl or $C_1$ to $C_{20}$ alkoxy, $M^1$, $M^2$=independently of one another Li, Na, K, ½Ca or ½Mg.

Further preferably, according to the present invention, at least one compound selected from the group consisting of acylcyanamides or a salt thereof of formula (I) or formula (II) may be used, wherein radical $R^1$ and cations $M^1$, $M^2$ independently of one another mean:

$R^1$=hydrogen, methyl, ethyl, n-propyl, 1-methylethyl, n-butyl, 1-methylpropyl, 2-methylpropyl, n-pentyl, n-hexyl, n-heptyl, n-octyl or a radical Q, wherein Q is:

Q=methyl, ethyl, n-propyl, 1-methylethyl, n-butyl, 1-methylpropyl, 2-methylpropyl, n-pentyl, n-hexyl, n-heptyl, n-octyl, each substituted by a radical of formula (III) or formula (IV)

$M^1$, $M^2$=independently of one another Na or K.

Particularly preferably, according to the present invention, at least one compound selected from the group consisting of sodium formylcyanamide, sodium acetylcyanamide, sodium propionylcyanamide, sodium n-butyrylcyanamide, sodium isobutyrylcyanamide, sodium methoxycarbonylcyanamide, sodium ethoxycarbonylcyanamide, potassium formylcyanamide, potassium acetylcyanamide, potassium propionylcyanamide, potassium n-butyrylcyanamide, potassium isobutyrylcyanamide, potassium methoxycarbonylcyanamide, potassium ethoxycarbonylcyanamide may be used.

Alternatively preferably, according to the present invention, at least one compound selected from the group consisting of acylcyanamides or a salt thereof according to formula (I) or formula (II) may be used, wherein radicals $R^1$, $R^2$, $R^3$, $R^4$, $R^5$ and cations $M^1$, $M^2$ independently of one another mean:

$R^1$=hydrogen, methyl, ethyl, n-propyl, n-butyl, n-pentyl, n-hexyl, or a radical of formula (V) or of formula (VI), Formula (V)

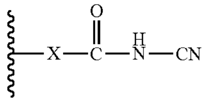

Formula (VI)

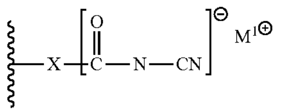

wherein X in formula (V) and formula (VI) means:

X=alkanediyl, in particular $C_1$-$C_{20}$ alkanediyl $M^1$, $M^2$=independently of one another Li, Na, K, ½Ca, ½Mg, or $NR^2R^3R^4R^5$, $R^2$, $R^3$, $R^4$, $R^5$=independently of one another hydrogen or $C_1$ to $C_{20}$ alkyl.

Alternatively preferably, according to the present invention, at least one compound selected from the group consisting of acylcyanamides or a salt thereof according to formula (I) or formula (II) may also be used, wherein radical $R^1$, $R^2$ $R^3$, $R^4$, $R^5$ and cations $M^1$, $M^2$ independently of one another mean:

$R^1$=aryl, alkylaryl or arylalkyl, or a radical Q, wherein Q is:

Q=aryl, alkylaryl or arylalkyl, each substituted by a radical of formula (III) or formula (IV), $M^1$, $M^2$=independently of one another Li, Na, K, ½Ca, ½Mg, or $NR^2R^3R^4R^5$, $R^2$, $R^3$, $R^4$, $R^5$=independently of one another hydrogen or $C_1$ to $C_{20}$ alkyl.

According to the invention, acylcyanamides according to formulas (I) or (II) can be used to regulate the generative growth of plants, in particular the generative growth of crops and cultivated plants, preferably the generative growth of fruit trees, or for breaking dormancy of fruit trees.

In this context, generative growth of a plant is to be understood as meaning that growth of the plant which is characterized by the formation of sexual characteristics such as flowers, seeds, fruits or plant parts which are mainly used for reproduction. The regulation of generative growth can occur in different plant species by different factors such as daylight duration, cold hours or drought stress. A direct transition from dormancy to generative growth can also be induced.

Furthermore, dormancy is to be understood as a period of rest in the development and life cycle of plants, which is characterized by a non-growth of the plant.

Furthermore, a crop and cultivated plant shall be understood to mean a plant which is purposefully planted, cultivated or breeded through human intervention and which is used as a whole or in parts as food, luxury food, cure, as feed for animals or for technical purposes, for example as a renewable raw material. Furthermore, fruit trees or fruit tree plants shall be understood to mean perennial flower- and wood-forming plants. The term includes perennial trees or shrubs that are perennial plants whose axes become woody and are permanently maintained so that their above-ground shoot system increases in size over the years.

Such trees or shrubs that bear fruit are also defined as fruit trees and include grape (*Vitis vinifera*), kiwi (*Actinidia deliciosa*, *Actinidia chinensis*, or *Actinidia arguta*), blueberry (*Vaccinium myrtillus*, *Vaccinium corymbosum*, *Vaccinium virgatum*, *Vaccinium angustifolium* or *Vaccinium myrtilloides*), cherry (*Prunus avium* or *Prunus cerasus*), plum or damson (*Prunus domestica*), apple (*Malus domestica* or *Malus orientalis*), pear (*Pyrus communis*, *Pyrus pyraster* or *Pyrus pyrifolia*), quince (*Cydonia oblonga*), peach (*Prunus persica*), apricot (*Prunus armeniaca*), raspberry (*Rubus idaeus*), persimmon (*Diospyrus kaki*), fig (*Ficus carica*) or their cross products or cultivars.

The formation of flowers of fruit trees can occur differently on the tree or shrub depending on the genus and species. In tropical plant families, such as breadfruit tree (*Artocarpus altitis*), jackfruit (*Artocarpus heterophyllus*), papaya (*Carica papaya*) or cocoa (*Theobroma cacao*), cauliflory (caulifolory) is the term used for stem flowering or termed stem fruiting in the following, where individual flowers or inflorescences are formed on the woody stem.

However, depending on the genus and species, the formation of flowers of fruit trees can also take place via a subform of branch fruiting (ramiflory). Here, flower formation occurs on the branches. Both forms of flowering can be found in cocoa. For this purpose, flower formation in clusters occurs on the two- to three-year-old woody branch wood on secondary buds arranged in the leaf axils with meristematic tissue. According to the present invention, crops and cultivated plants can be particularly treated. These crops and cultivated plants may be treated as naturally occurring plants, as cross products of these plants, or as cultivars.

Thus, according to a further embodiment subject matter of the invention is also the use of at least one compound from the group of acylcyanamides or a salt thereof according to formula (I) or formula (II) for regulating the generative growth of plants, in particular the generative growth of crops and cultivated plants, preferably the generative growth of fruit trees, or for breaking the dormancy of fruit trees, wherein the plants, the crops and cultivated plants or the fruit trees are selected from the group of plants comprising grape (*Vitis vinifera*), kiwi (*Actinidia deliciosa, Actinidia chinensis* or *Actinidia arguta*), blueberry (*Vaccinium myrtillus, Vaccinium corymbosum, Vaccinium virgatum, Vaccinium angustifolium* or *Vaccinium myrtilloides*), cherry (*Prunus avium* or *Prunus cerasus*), plum or damson (*Prunus domestica*), apple (*Malus domestica* or *Malus orientalis*), pear (*Pyrus communis, Pyrus pyraster*, or *Pyrus pyrifolia*), quince (*Cydonia oblonga*), peach (*Prunus persica*), apricot (*Prunus armeniaca*), raspberry (*Rubus idaeus*), persimmon (*Diospyrus kaki*), fig (*Ficus carica*), or their cross products or cultivars are treated.

According to a further embodiment, a plant growth regulator concentrate is also subject matter of the present invention. This concentrate serves to provide the acylcyanamides of the invention or salts thereof as plant growth regulators or dormancy breakers in a user-friendly manner. Thus, it is also subject matter of the present invention to provide a plant growth regulator concentrate for regulating the generative growth of plants, in particular the generative growth of crops and cultivated plants, preferably the generative growth of fruit trees, or for breaking the dormancy of fruit trees, which comprises:

a) at least one active ingredient from the group of acylcyanamides or a salt thereof according to formula (I) or formula (II), wherein the following applies to formula (I) and formula (II):

Formula (I)

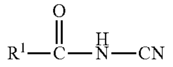

Formula (II)

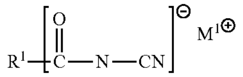

wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl, arylalkyl or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV)

Formula (III)

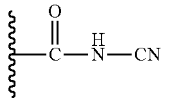

Formula (IV)

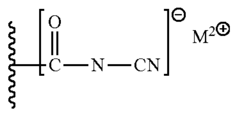

$M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl, b) at least one additive from the group of solvents, oils, surfactants or emulsifiers that is safe or approved for agricultural purposes, wherein the concentrate having a concentration of active ingredient in the range of 100 to 600 g/l.

The active ingredient in this concentrate may be any of the acylcyanamides described herein, as well as any of the acylcyanamides described herein as preferred or alternatively preferred, wherein the concentrate has a concentration of active ingredient in the range of 100 to 600 g/l. According to a preferred embodiment, the concentrate has a concentration of active ingredient in the range from 200 to 600 g/l, in particular a concentration of active ingredient in the range from 300 to 600 g/l.

According to a preferred embodiment, the concentrate is present as a solution, emulsifiable solution or emulsion, in particular as an aqueous solution or as an emulsion.

In this context and for the purposes of the present invention, the term emulsion is understood to mean a mixture of at least two liquid components which are not completely miscible with one another and which, in particular, have a miscibility gap. Herein, one component is dispersed as a dispersed or inner liquid phase in another coherent outer liquid phase. For the purposes of the present invention, the term oil-in-water emulsion, also referred to as O/W emulsion, means an emulsion in which an oil phase is dispersed in a coherent hydrophilic, preferably aqueous, phase. The oil phase comprises a hydrophobic, water-immiscible organic phase comprising an oil. Herein, the oil phase is dispersed in the hydrophilic, preferably aqueous, phase in the form of droplets. The term water-in-oil emulsion, also referred to as W/O emulsion, in the sense of the present invention is understood to mean an emulsion in which a water phase or an aqueous phase is dispersed in a coherent hydrophobic phase, preferably oil phase. For the purposes of the present invention, the term emulsion also includes miniemulsions and microemulsions.

Furthermore, an emulsifiable solution shall be understood to be such a solution which, after addition to water (or addition of water to the composition), independently forms an emulsion or which, after addition to water (or addition of water to the composition) and mechanical mixing, such as stirring, forms an emulsion.

Thus, a plant growth regulator concentrate for regulating the generative growth of plants, in particular the generative growth of crops and cultivated plants, preferably the generative growth of fruit trees, or for breaking the dormancy of fruit trees, is also subject matter of the present invention, comprising a solution, emulsifiable solution or to emulsion, in particular an aqueous solution or emulsion, which in turn:

a) at least one active ingredient from the group of acylcyanamides or a salt thereof according to formula (I) or formula (II), wherein the following applies to formula (I) and formula (II):

Formula (I)

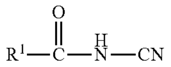

-continued

Formula (II)

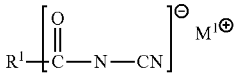

wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl, arylalkyl or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV)

Formula (III)

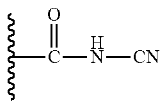

Formula (IV)

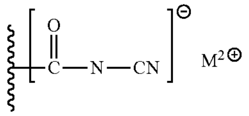

$M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl, b) at least one additive from the group of solvents, oils, surfactants or emulsifiers that is safe or approved for agricultural purposes, wherein the solution, emulsifiable solution or emulsion has a concentration of active ingredient in the range of 100 to 600 g/l.

Preferably, the plant growth regulator concentrate, which further preferably is a solution, an emulsifiable solution, or an emulsion or comprises such, comprises:

a) at least one active ingredient from the group of acylcyanamides or a salt thereof according to formula (I) or formula (II), and b) at least one additive from the group of solvents which is safe or approved for agricultural purposes, and optionally c) at least one additive from the group of oils, surfactants or emulsifiers which is safe or approved for agricultural purposes, and optionally d) at least one other formulation adjuvant, wherein the concentrate having a concentration of active ingredient in the range of 100 to 600 g/l.

Further preferred is a plant growth regulator concentrate, in particular present as a solution, emulsifiable solution or emulsion, in particular as an aqueous solution or as an emulsion, which in turn comprises:

a) at least one active ingredient from the group of the acylcyanamides or a salt thereof, according to formula (I) or formula (II), wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, each substituted by a radical of formula (III) or formula (IV), $M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl.

Particularly preferred is a plant growth regulator concentrate, in particular in the form of a solution, emulsifiable solution or emulsion, in particular as an aqueous solution or as an emulsion, which in turn comprises:

a) at least one active ingredient from the group consisting of sodium formylcyanamide, sodium acetylcyanamide, sodium propionylcyanamide, sodium n-butyrylcyanamide, sodium isobutyrylcyanamide, sodium methoxycarbonylcyanamide, sodiumethoxycarbonylcyanamide, potassium formylcyanamide, potassium acetylcyanamide, potassium propionylcyanamide, potassium n-butyrylcyanamide, potassium isobutyrylcyanamide, potassium methoxycarbonylcyanamide or potassiumethoxycarbonylcyanamide, b) at least one additive from the group of solvents which is safe or approved for agricultural purposes, and c) at least one additive from the group of oils, surfactants or emulsifiers that is safe or approved for agricultural purposes, wherein the concentrate having a concentration of active ingredient in the range of 100 to 600 g/l.

According to the present invention, the plant growth concentrate may contain a solvent. In the context of the present invention, a solvent is to be understood as any solvent that is suitable for use in agriculture. Suitable solvents are thus those solvents which are compatible with plants. Water or organic solvents, in particular water-miscible organic solvents, are particularly preferred.

In the context of the present invention, a water-miscible organic solvent is to be understood as any organic solvent which, by definition, is different from water and which, in a mass ratio of 1:1 with water at 20° C., results in a single-phase system.

The investigations on which this invention is based have shown that organic solvents selected from the group consisting of water-soluble alcohols, ketones, nitriles, amides, glycols, polyglycols and mixtures thereof can be used as water-miscible organic solvents.

Preferred solvents are thus water and organic solvents selected from the group consisting of ethanol, isopropanol, n-propanol, glycol, glycerol, polyglycol, acetone, methyl ethyl ketone, acetonitrile, propionitrile, formamide, dimethyl formamide, N-methyl pyrrolidone, and mixtures thereof.

According to a particularly preferred embodiment of the invention, the concentrate comprises water, ethanol, isopropanol, n-propanol, glycol, glycerol, polyglycol or mixtures thereof as solvents. Concentrates with these solvents are shown to be particularly storage-stable liquid formulations that can be stored over a longer period of time.

Thus, also subject matter of the present invention is a plant growth regulator concentrate, which is a solution, an emulsifiable solution or an emulsion comprising as solvent a solvent selected from the group consisting of water, ethanol, isopropanol, glycol, polyglycol, glycerol or mixtures of these solvents.

According to an alternative formulation, the concentrate can also be prepared as an emulsifiable solution. Therefore, according to a further development of the invention, in particular also a concentrate is subject matter of the present invention that is prepared as an emulsifiable solution and that contains less than 10 wt. %, in particular less than 5 wt. %, more preferably less than 3 wt. % of water, further preferably less than 2 wt. % of water and very particularly preferably less than 1 wt. % of water.

According to the present invention, the plant growth concentrate may contain an oil. Herein, in the context of the present invention, an oil is to be understood as any oil that is suitable for use in agriculture. Suitable oils are thus those oils that are compatible with plants. In particular, the oil may be selected from the group of natural oils, in particular oils of animal or vegetable origin, and synthetic oils. According to the present invention, natural oils, in particular vegetable oils, may be used as oil.

Vegetable oils are generally known and commercially available. The term vegetable oils in the sense of the present invention is understood to mean oils from oil-producing plant species such as soybean oil, corn oil, sunflower oil, rapeseed oil, cottonseed oil, linseed oil, coconut oil, palm oil, safflower oil, peanut oil, walnut oil, olive oil or rhizinus oil, in particular rapeseed oil, wherein vegetable oils are also understood to mean their transesterification products, for example alkyl esters such as rapeseed oil methyl ester or rapeseed oil ethyl ester.

The vegetable oils according to the present invention are preferably mixtures of $C_{10}$ to $C_{24}$ fatty acid esters. These $C_{10}$ to $C_{24}$ fatty acid esters are, for example, esters of unsaturated or saturated $C_{10}$ to $C_{24}$ fatty acids, in particular with an even number of carbon atoms, further preferably selected from the group consisting of capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid), palmitoleic acid (hexadecyl-9-enoic acid), petroselinic acid (octadecyl-6-enoic acid), oleic acid (octadecyl-9-enoic acid), elaidic acid (octadecyl-9-enoic acid), gadoleic acid (eicosan-9-enoic acid), erucic acid (13-docosenoic acid), linoleic acid (octadec-9,12-dienoic acid), alpha-linolenic acid (octadec-9,12,15-trienoic acid), gamma-linolenic acid (octadec-6,9,12-trienoic acid), or mixtures thereof.

Examples of vegetable oils are $C_{10}$ to $C_{24}$ fatty acid esters of glycerol or glycol with $C_{10}$ to $C_{24}$ fatty acids, in particular esters of the listed acids, or $C_{10}$ to $C_{24}$ fatty acid esters, in particular esters of the listed acids, as can be obtained, for example, by transesterification of the above-mentioned glycerol or glycol esters of $C_{10}$ to $C_{24}$ fatty acid with $C_1$ to $C_{20}$ alcohols, such as methanol, ethanol, propanol or butanol.

The vegetable oils may be present in the liquid compositions according to the invention, for example, in the form of commercially available vegetable oils, in particular rapeseed oils such as rapeseed oil methyl ester, for example Phytorob® B (Novance, France), Edenor® MESU and Agnique® ME series (Cognis, Germany), Radia® (ICI) or Prilube® (Petrofina).

Insofar as synthetic oils are used, mineral oil, kerosene oil, white oil and synthetic fatty acid esters, in particular esters of fatty acids with an uneven number of carbon atoms, such as $C_{11}$ to $C_{19}$ fatty acids, in particular selected from the group consisting of undecanoic acid, tridecanoic acid, pentadecanoic acid, margaric acid (heptadecanoic acid) and nonadecanoic acid, with mono-, di- or trihydric $C_1$ to $C_5$ alcohols, in particular methanol, ethanol, propanol or butanol, are preferred.

According to the present invention, therefore, the oil used may be in particular an oil selected from the group consisting of mineral oil, kerosene oil, white oil, saturated linear or branched aliphatic hydrocarbons, esters of saturated or unsaturated fatty acids with mono-, di- or trihydric $C_1$ to $C_5$ alcohols, ethers of fatty alcohols with $C_1$ to $C_5$ alcohols and mixtures thereof.

Preferably, oils from the group consisting of mineral oils, mineral oils with reduced aromatic content, mineral oils without aromatic content, fatty oils, i.e. glycerol esters of fatty acids with 4 to 24 C atoms, esters of $C_1$ to $C_{20}$ alcohols with fatty acids with 4 to 24 C atoms, preferably methyl or ethyl esters of fatty acids with 4 to 24 C atoms, can also be used according to the present invention.

Particularly suitable are oils from the group comprising esters of $C_1$ to $C_{20}$ alcohols with fatty acids having 4 to 24 C atoms, in particular methyl or ethyl esters of fatty acids having 4 to 24 C atoms.

Thus, also subject matter of the present invention is a plant growth regulator concentrate, which is a solution, an emulsifiable solution or an emulsion comprising as oil an oil from the group of vegetable oils, in particular vegetable oils from the group of $C_{10}$ to $C_{24}$ fatty acid esters, in particular methyl, ethyl, glyceryl or glycol esters of $C_{10}$ to $C_{24}$ fatty acids, in particular rapeseed oil methyl esters.

According to the present invention, the plant growth regulator concentrate may in particular comprise 0.1 to 20 wt. % of at least one oil, in particular a vegetable oil. Preferably, however, the plant growth regulator concentrate may also comprise 0.1 to 15 wt. % of at least oil, in particular a vegetable oil, and further preferably 0.1 to 12 wt. % of at least oil, in particular a vegetable oil, and particularly preferably 0.1 to 10 wt. % of at least oil.

Surfactants that have an HLB value of 5 to 20 can be used in particular. Furthermore, in particular cationic, anionic or nonionic surfactants can also be used as surfactants. Particularly preferred, nonionic surfactants can be used.

Thus, also subject matter of the present invention is a plant growth regulator concentrate, which is a solution, an emulsifiable solution or an emulsion comprising as surfactant a surfactant selected from the group consisting of nonionic surfactants.

Further preferred nonionic surfactants can be used which contain one or more compounds from the group of ethoxylates according to formula (VII), of fatty alcohol glucosides according to formula (VIII) or mixtures thereof, wherein the following applies to formula (VII) and (VIII), Formula (VII)

$$R^{11}—O—(CH_2CH_2O)_n—H$$

Formula (VIII)

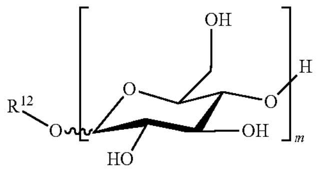

wherein radicals $R^{11}$, $R^{12}$ and indices n, m simultaneously or independently mean:

$R^{11}$=a linear or branched alkyl or alkenyl group having 6 to 24 carbon atoms, a partially or fully fluorinated alkyl group having 6 to 18 carbon atoms, a phenyl group, an alkyl-substituted phenyl group, a mono- or polyfunctional siloxane group, $R^{12}$=a linear or branched alkyl or alkenyl group containing 6 to 24 carbon atoms, N=a number from 2 to 20, m=a number from 1 to 5.

Herein, in the context of the present invention, a mono- or polyfunctional siloxane group should be understood to mean, in particular, a siloxane group formed by mixed hydrolysis of a) one or more chlorosilanes selected from the group consisting of trimethylchlorosilane, dimethyldichlorosilane and methyltrichlorosilane, and b) one or more 3-heteropropyl-substituted chlorosilanes selected from the group consisting of 3-heteropropyl-trichlorosilane, 3-heteropropyl-methyldichlorosilane and 3-heteropropyl-dimethylchlorosilane, wherein 3-heteropropyl is 3-chloropropyl, 3-hydroxypropyl or 3-(hydroxyethoxy)propyl.

Typical mono- or polyfunctional siloxane groups that can be prepared from these building blocks are given below in the formulas, wherein formula (IX) stands for a monofunctional siloxane group, formula (X) stands for a bifunctional siloxane group, and formulae (XI) and (XII) stand for a v-functional siloxane group, and the following applies to formulae (IX), (X), (XI) and (XII):

$$(H_3C)_3Si—O—((CH_3)_2SiO)_x—Si(CH_3)_2—(CH_2)_3— \quad \text{Formula (IX)}$$

wherein index x is:

x=a number from 0 to 15, in particular a number from 0 to 10, in particular a number from 3 to 10, $$H—(OCH_2CH_2)_y—O—(CH_2)_3—((CH_3)_2SiO)_z—Si(CH_3)_2—(CH_2)_3— \quad \text{Formula (X)}$$

wherein indices y and z are:

y=a number from 2 to 20, in particular a number from 2 to 10, in particular a number from 3 to 10, z=a number from 0 to 10, in particular a number from 0 to 5, in particular a number from 1 to 3, Formula (XI)

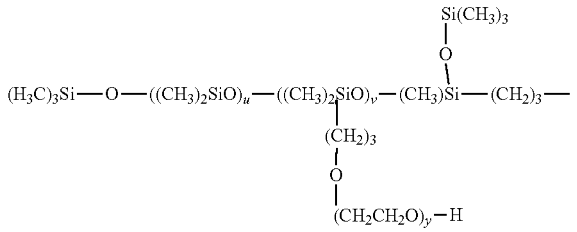

wherein indices y, u and v are:

y=a number from 2 to 20, in particular a number from 2 to 10, in particular a number from 3 to 10, u=a number from 0 to 15, in particular a number from 0 to 10, in particular a number from 0 to 3, v=a number from 0 to 4, in particular a number from 0 to 3.

Particularly preferred are v-functional siloxane groups, in particular siloxane groups of formula (XII), which is a special case of formula (XI) for u=v=0, wherein the following applies to formula (XII):

Formula (XII)

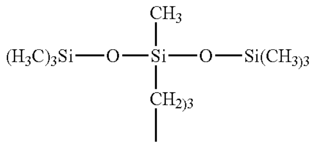

According to a particularly preferred embodiment, it is provided that an ethoxylate according to formula (VII) is used as nonionic surfactant, wherein radical $R^{11}$ and index n are:

$R^{11}$=linear or branched alkyl group having 8 to 18 carbon atoms, or alkyl-substituted phenyl group, or a monofunctional siloxane of formula (VII) with x=a number from 3 to 10, or a bifunctional siloxane of formula (VIII) with z=a number from 1 to 3 and y=a number from 2 to 10, or a polyfunctional siloxane group of formula (X) with u=a number from 0 to 3 and v=a number from 0 to 3 and y=a number from 2 to 10, in particular a number from 3 to 10, n=a number from 2 to 20, in particular a number from 2 to 10, in particular a number from 3 to 10.

According to a further preferred embodiment, a mixture of different ethoxylates according to formula (VII) can also be used as nonionic surfactant. In this case, a mixture of at least two different ethoxylates according to formula (VII) has been shown to be particularly effective, wherein the following applies to radical $R^{11}$ and index n:

$R^{11}$=a polyfunctional siloxane group of formula (XI) with u=a number from 0 to 3 and v=a number from 0 to 3 and y=a number from 2 to 10, n=a number from 2 to 20, in particular a number from 2 to 10, in particular a number from 3 to 10.

According to a further preferred embodiment, a mixture of different ethoxylates according to formula (VII) can also be used as nonionic surfactant. In this case, a mixture of at least two different ethoxylates according to formula (VII) has been shown to be particularly effective, wherein the following applies to radical $R^{11}$ and index n:

$R^{11}$=n-dodecyl, n-hexadecyl and n-octadecyl, n=a number from 2 to 20, in particular a number from 2 to 10.

Particularly preferred are ethoxylates according to formula (VII), wherein the following applies to radical $R^1$ and index n:

$R^{11}$=n-dodecyl, n-tetradecyl, n-hexadecyl, n-octadecyl, methyldecyl, methyl dodecyl, methyl tetradecyl, or a siloxane of formula (XII), n=a number from 4 to 8.

According to an alternative preferred embodiment, it is provided that a fatty alcohol glucoside according to formula (VIII) is used as the nonionic surfactant, wherein the following applies to radical $R^{12}$ and index m:

$R^{12}$=linear alkyl group with 8 to 18 carbon atoms, m=a number from 2 to 5.

Very particularly preferred are fatty alcohol glucosides according to formula (VIII), wherein the following applies to radical $R^{12}$ and index m:

$R^{12}$=n-hexadecyl or n-octadecyl, m=a number from 3 to 5

According to the present invention, the plant growth regulator concentrate may comprise, in particular, 0.1 to 10 wt. % of at least one surfactant, in particular a nonionic surfactant. Particularly preferably, however, the composition may also comprise 0.1 to 5 wt. % of at least one surfactant, in particular a nonionic surfactant, and very particularly preferably 0.1 to 3 wt. % of at least one surfactant, in particular a nonionic surfactant.

The plant growth regulator concentrate according to the invention may comprise at least one emulsifier as a safe or approved additive. Preferably, the concentrate according to the invention comprises at least one emulsifier selected from the group of oil-in-water emulsifiers (O/W emulsifier), water-in-oil emulsifiers (W/O emulsifier), oil-in-water-in-oil emulsifiers (O/W/O emulsifier) or water-in-oil-in-water emulsifiers (W/O/W emulsifier), in particular at least one oil-in-water emulsifier.

According to a particularly preferred embodiment, the composition comprises at least one oil-in-water emulsifier and/or a nonionic emulsifier, and very particularly preferably at least one nonionic emulsifier from the class of oil-in-water emulsifiers.

Thus, plant growth regulator concentrate is also subject matter of the present invention, which is a solution, an emulsifiable solution or an emulsion comprising as emulsifier an emulsifier selected from the group consisting of nonionic oil-in-water emulsifiers.

Preferred nonionic emulsifiers are selected from the group containing fatty acid polyglycol esters, alkylaryl polyglycol ethers, fatty alcohol polyglycol ethers, ethoxylated fatty alcohols, ethoxylated nonylphenols, fatty acid monoglycerides, fatty acid diglycerides, ethoxylated and hydrogenated or non-hydrogenated castor oil and fatty acid alkanolamides.

Preferred cationic emulsifiers are selected from the group containing long-chain quaternary ammonium compounds such as alkyltrimethylammonium salts and dialkyldimethylammonium salts with C8 to C22 alkyl groups.

Preferred anionic emulsifiers are selected from the group containing fatty alcohol sulfates, alkyl ether sulfates and alkyl benzene sulfonates.

Preferred amphoteric emulsifiers are selected from the group containing betaines such as fatty acid amidoalkyl betaines and sulfobetaines and C8 to C22 alkyl betaines.

Particularly preferred are nonionic emulsifiers from the class of ethoxylated fatty alcohols, especially ethoxylated C8 to C20 alkyl alcohols. Also preferred is a nonionic O/W emulsifier from the class of ethoxylated C8 to C20 alkyl alcohols and, very particularly preferably, an iso-C13-ethoxylate.

According to the present invention, the plant growth regulator concentrate may particularly comprise 0.1 to 10 wt. % of at least one emulsifier. However, particularly preferably, the composition may also comprise 0.1 to 5 wt. % of at least one emulsifier and very particularly preferably 0.1 to 3 wt. % of at least one emulsifier.

Within the scope of the present invention, it may further be provided that the plant growth regulator concentrate comprises or contains further ingredients, namely formulation adjuvants.

Preferably, the concentrate further comprises or contains at least one formulation adjuvant, in particular one approved for agricultural purposes, selected from the group consisting of pH regulators, colorants, thickeners, dispersants, solubilizers, viscosity modifiers, labeling agents and bittering agents.

These formulation adjuvants may be comprised or contained in the solution in an amount up to 5 wt. %. These formulation adjuvants may be used in addition to the additives from the group of solvents, oils, surfactants and emulsifiers described herein and have no effect on the plant physiological effect of the spray mixture produced from a concentrate according to the invention. Thus, these further formulation adjuvants fulfil exclusively application-specific requirements.

It is particularly preferred that the formulation adjuvants are comprised or contained in an amount of up to 4 wt. %, further preferred up to 3 wt. % and particularly preferred up to 2 wt. %. Should the concentrate according to the invention comprise formulation adjuvants due to application-specific requirements, the concentrate may preferably comprise or contain at least 0.01 wt. % of formulation adjuvants, in particular at least 0.1 wt. % (in each case based on the total weight of the concentrate).

According to the present invention, the plant growth concentrate has a concentration of active ingredient in the range from 100 to 600 g/l. Preferably, the concentrate according to the present invention comprises or contains at least 10 wt. % and at most 60 wt. % of at least one compound from the group of the acylcyanamides or a salt thereof according to formula (I) or formula (II) (based on the total weight of the concentrate). Further preferably, the concentrate according to the invention comprises or contains at least 20 wt. %, further preferably at least 30 wt. % and very particularly preferably at least 35 wt. % of at least one compound from the group of the acylcyanamides or a salt thereof according to formula (I) or formula (II) (based on the total weight of the concentrate).

Thus, a plant growth regulator concentrate is also subject matter of the present invention, in particular a plant growth regulator concentrate which is in the form of a solution, emulsifiable solution or emulsion comprising a) 10 to 60 wt. % of at least one active ingredient selected from the group consisting of acylcyanamides or a salt thereof according to formula (I) or formula (II), and
b) 40 to 90 wt. % of at least one solvent, in particular water or a water-miscible solvent, and optionally c) 0.1 to 12 wt. % of at least one oil, surfactant and/or emulsifier, and optionally
d) 0.01 to 5 wt. % of at least one further formulation adjuvant, wherein the proportions a) to d) add up to 100 wt. %, and wherein in particular the at least one compound from the group of acylcyanamides or a salt thereof is present in the concentrate in dissolved form.

Very particularly preferably, the plant growth regulator concentrate according to the present invention comprises a) 30 to 60 wt. % of at least one active ingredient selected from the group consisting of acylcyanamides or a salt thereof according to formula (I) or formula (II),
b) 40 to 70 wt. % of at least one solvent, in particular water or a water-miscible solvent, and optionally c) 0.1 to 8 wt. % of at least one oil, emulsifier or surfactant, and optionally,
d) 0.01 to 3 wt. % of at least one other formulation adjuvant, wherein the proportions a) to d) add up to 100 wt. %, and wherein in particular the at least one compound from the group of acylcyanamides or a salt thereof is present in the concentrate in dissolved form.

However, it may also be provided that the plant growth regulator concentrate according to the present invention has no further ingredients in addition to said ingredients a), b), c) and optionally d) and thus consists of said ingredients.

In a further advantageous embodiment of the invention, the concentrate according to the invention has a surface tension at a temperature of 25° C. of less than 70 mN/m, preferably of less than 60 mN/m, and very particularly preferably of less than 40 mN/m, wherein simultaneously or independently thereof it may be provided that the concentrate has a surface tension at a temperature of 25° C. of at least 5 mN/m.

In a further advantageous embodiment of the invention, the concentrate according to the invention has a viscosity of less than 1 Pa*s at a temperature of 25° C. Preferably, the concentrate according to the invention has a viscosity of less than 500 mPa*s, more preferably less than 100 mPa*s and even more preferably less than 50 mPa*s at 25° C.

With the plant growth regulator concentrates according to the invention, high active ingredient concentrations can be provided. However, in the application of the active ingredients described herein, these concentrations are much too high. These concentrates must be diluted prior to their application, particularly as a spray, dip or brush solution.

Application tests have shown that the active ingredients described herein from the group of acylcyanamides or a salt thereof according to formula (I) or formula (II) can be used, in particular as a spray, dip or brush solution, preferably in a concentration in the range from 0.05 to 1 mol/l.

Further preferably, it has been shown that these active ingredients, in particular as a spray, dip or brush solution, can be used in a concentration in the range from 0.05 to 0.8 mol/l, in particular 0.05 to 0.6 mol/l and particularly preferably 0.05 to 0.5 mol/l.

Further preferably, it has been shown that these active ingredients can be used, in particular as a spray, dip or brush solution, in a concentration in the range from 0.1 to 1 mol, in particular 0.1 to 0.8 mol/l, in particular 0.1 to 0.6 mol/l and particularly preferably 0.1 to 0.5 mol/l.

Furthermore, the use of the plant growth regulator concentrate described herein or a spray or dip solution prepared from or with said concentrate for regulating the generative growth of plants, in particular the generative growth of crops and cultivated plants, preferably the generative growth of fruit trees, or for breaking the dormancy of fruit trees is encompassed by the present invention.

According to a further embodiment, a plant growth regulator spray solution for regulating the generative growth of plants, in particular the generative growth of crops and cultivated plants, preferably the generative growth of fruit trees, or for breaking the dormancy of fruit trees comprising a solution or emulsion, is thus also subject matter of the present invention, which comprises:

a) at least one active ingredient from the group of acylcyanamides
   or a salt thereof according to formula (I) or formula (II), wherein the following applies to formula (I) and formula (II):

Formula (I)

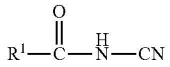

Formula (II)

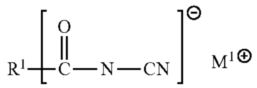

wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV)

Formula (III)

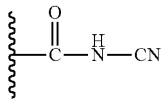

Formula (IV)

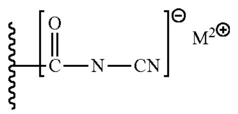

$M^1$, $M^2$=independently of one another Li, Na, K, ½ Ca, ½Mg, or $NR^2R^3R^4R^5$, $R^2$, $R^3$, $R^4$, $R^5$=independently of one another hydrogen or $C_1$ to $C_{20}$ alkyl, b) at least one additive or adjuvant from the group of solvents, oils, surfactants or emulsifiers that is safe or approved for agricultural purposes, wherein the aqueous solution having a concentration of active ingredient in the range from 0.05 to 1 mol/l, in particular 0.05 to 0.8 mol/l, in particular 0.05 to 0.6 mol/l, in particular 0.05 to 0.5 mol/l.

Thus, in accordance with a further embodiment, a method for regulating the generative growth of plants, in particular the generative growth of crops and cultivated plants, preferably the generative growth of fruit trees, or for breaking the dormancy of fruit trees, is also subject matter of the present invention, comprising application by dipping, brushing or spraying of the branches, sprouts or buds of the plants with an aqueous solution comprising at least one active ingredient from the group of acylcyanamides or a salt thereof according to formula (I) or formula (II), during dormancy of the plants, the crops and cultivated plants or the fruit trees.

The following examples will further explain the essence of the invention.

EXAMPLES

Synthesis Examples

Example A-1

Synthesis of Sodium Acetylcyanamide (CAS 84946-07-6) from Solid Cyanamide 180.1 g (1.0 mol) of a 30% solution of sodium methylate was introduced. Under good cooling, a total of 42.25 g (1.005 mol) of solid cyanamide was introduced in portions at a maximum of 25° C. Then 134.83 g (1.82 mol) of methyl acetate was added and the suspension was heated to reflux (about 64° C.) for 10 hours. The reaction mixture was cooled to 10° C., the precipitated sodium acetylcyanamide fraction 1 was filtered off and dried at 60° C. The obtained mother liquor was evaporated to half the volume, cooled to 10° C. and the precipitated fraction 2 was filtered off and dried. In total, the following were obtained:

Fraction 1: 75 g (71% yield) with 99.4% content, melting point 239° C.

Fraction 2: 19 g (18% yield) with 99.0% content, melting point 238° C.

$^1$H-NMR in DMSO 1.70 ppm (s), $^{13}$C-NMR 180.75, 122.60, 25.26 ppm

Example A-1a

Synthesis of Sodium Acetylcyanamide (CAS 84946-07-6) from Sodium Hydrogencyanamide 120 g methanol and 88.8 g (1.20 mol) methyl acetate were introduced. 64.04 g (1.0 mol) sodium hydrogencyanamide was suspended in it. The reaction mixture was heated to 70° C. for 10 hours. Then, it was completely evaporated to dryness and the solid obtained was post-dried at 60° C. in vacuo. 106 g (100% yield) of sodium acetylcyanamide with a content of 98.9% was obtained.

Example A-1 b

Synthesis of Acetylcyanamide (CAS 5634-51-5) as Free NH Acid 120 g methanol and 88.8 g (1.20 mol) methyl acetate were introduced. 64.04 g (1.0 mol) sodium hydrogencyanamide was suspended in it. The reaction mixture was heated to 70°

C. for 10 hours. Then it was cooled and another 500 g of methanol was added. At 10 to 20° C., 49.0 g (0.5 mol) of concentrated sulfuric acid was added, precipitating sodium sulfate. The suspension was filtered, rewashed with methanol, and the combined filtrates were largely completely evaporated. 84 g of an oil with density 1.100 g/$cm^3$ and refractive index no 1.425, each measured at 20° C., were obtained. The yield was quantitative.

Example A-1c

Synthesis of Potassium Acetylcyanamide (CAS 1146597-19-4)

280.4 g (1.0 mol) of a 25% solution of potassium methylate was introduced. Under good cooling, a total of 42.25 g (1.005 mol) of solid cyanamide was introduced in portions at a maximum of 25° C. Then 134.83 g (1.82 mol) of methyl acetate was added and the suspension was heated to reflux (about 64° C.) for 10 hours. The reaction mixture was evaporated to about half the volume and cooled to 10° C. The precipitated solid was filtered off and dried at 60° C. 94 g of a white solid with an N content of 23.0% was obtained. The yield was 77%.

Example A-2

Synthesis of Sodium Formylcyanamide (CAS 71675-63-3)

909.5 g (5.0 mol) of a 29.7% sodium methylate solution was introduced. Under good cooling at 10 to 20° C., a total of 211.05 g (5.0 mol) of 99.6% solid cyanamide was introduced in portions. Then 250 ml of methanol was added to ensure good stirring ability. Then, 309.55 g (5.0 mol) of a 97.0% formic acid methyl ester was added under cooling. The reaction mixture was heated to about 38° C. (strong reflux) for a total of 18 hours. It was then cooled to 10° C. and the precipitated product fraction 1 was filtered off and dried at 60° C. The filtrate was evaporated to dryness and post-dried (fraction 2). In total, the following were obtained:

Fraction 1: 343.9 g (75% yield) with 30.22% N content, melting point 256° C.

Fraction 2: 16.9 g (25% yield) with 30.34% N content, melting point 255° C.

$^1$H-NMR in DMSO: 8.43 ppm, $^{13}$C-NMR 171.88, 122.5 ppm

Examples A-3 to A-15

Synthesis of Further Sodium Acylcyanamides

The further syntheses were carried out analogously to Example A-1a from sodium hydrogencyanamide. According to the target compound desired in each case, 1.2 mol of a carboxylic acid methyl ester was introduced into 120 methanol, 64.04 g (1.0 mol) of sodium hydrogencyanamide was suspended therein and the reaction mixture was heated to reflux (about 65° C.) for mostly 10 hours. The obtained reaction mixtures were partially evaporated, mixed with 100 g of t-butyl methyl ether and the obtained suspensions were filtered off at 10° C. The respective products were washed with t-butyl methyl ether and dried at 60° C.

In the following tables 1 and 2, the respective substances, deviations from the above standard specification, if applicable, yields as well as the characterization of the obtained products have been summarized.

TABLE 1

Characteristic data of inventive acylcyanamides and their preparation

| Example no. | Product name | Input (carboxylic acid ester) | Process details and yield | Analytical data |
|---|---|---|---|---|
| A-3 | Sodium methoxy carbonyl cyanamide CAS 51234-98-1 | Dimethyl carbonate | complete evaporation of the reaction suspension; yield 99% | Content >98%, melting point 242.5° C. |
| A-4 | Sodium benzoyl cyanamide CAS 67998-88-3 | Benzoate acid methyl ester | Yield 76% | Content 100 %, melting point 295.6° C. |
| A-5 | Sodium propionyl cyanamide CAS 84945-99-3 | Propionic acid methyl ester | Yield 41% | Content >98%, melting point 143° C. under decomposition |
| A-6 | Sodium butyryl cyanamide | Butyric acid methyl ester | Yield 44% | Content >98%, melting point 176-181° C. |
| A-7 | Sodium isobutyryl cyanamide | Isobutyric acid methyl ester | Yield 57% | Content >96 %, contained approx. 4 % methanol, melting point 127-133° C. |
| A-8 | Sodium pivaloyl cyanamide | 2,2-dimethyl acetic acid methyl ester | 72 h reaction time required; yield 70% | Content >98%, melting point 295-300° C. |
| A-9 | Sodium hexanoyl cyanamide | Hexanoate acid methyl ester | Yield 55% | Content >98%, melting point 170-174° C. |
| A-10 | Sodium dodecanoyl cyanamide CAS 93238-02-9 | Dodecanoic acid methyl ester | Yield 82% | Content >98%, melting point 155-160° C. |
| A-11 | Sodium oleyl cyanamide | Oleate acid methyl ester | 72 hr reaction time required, the product was obtained by evaporation as oil; yield quantitative | Content approx. 85% |

TABLE 1-continued

| Characteristic data of inventive acylcyanamides and their preparation | | | | |
|---|---|---|---|---|
| Example no. | Product name | Input (carboxylic acid ester) | Process details and yield | Analytical data |
| A-12 | Sodium phenylacetyl cyanamide CAS 103818-57-1 | Phenylacetate acid methyl ester | Yield 60% | Content 96%, hygroscopic, contained 4% water, melting point 183-187° C. |
| A-13 | Sodium-4-methyl-benzoyl-cyanamide CAS 67998-89-4 | 4-Methylbenzoic acid methyl ester | Yield 73% | Content >98%, melting point 340° C. under decomposition |
| A-14 | Disodium-(3-(cyano-amidocarbonyl)-propionyl-cyanamide) CAS 88245-65-2 | Succinic acid dimethyl ester | Input 0.5 mol succinic acid dimethyl ester, 240 ml methanol; yield 48% | Content 92%, contained 8% sodium-3-(methoxycarbonyl)-propionyl-cyanamide, no melting point, decomposition starting at 300° C. |
| A-15 | Disodium-(5-(cyano-amidocarbonyl)-pentanoyl-cyanamide) CAS 88245-91-2 | Adipic acid dimethyl ester | Input 0.5 mol dimethyl adipate, 240 ml methanol; yield 36% | Content 96%, contained 4% sodium-5-(methoxycarbonyl)-pentanoyl-cyanamide, melting point 272-278° C. under decomposition |

TABLE 2

| NMR data of inventive acylcyanamides, each dissolved in $d_6$ DSMO | | |
|---|---|---|
| | $^1H$—NMR (ppm) | $^{13}C$-NMR (ppm) |
| A-3 | 3.40 | 163.39, 122.26, 51.55 |
| A-4 | 7.90 (m, 2H), 7.36 (m, 1H), 7.28 (m, 2H) | 174.77, 138.48, 129.89, 128.14 (2C). 127.44 (2C), 122.86 |
| A-5 | 1.94 (q), 0.89 (t) | 183.59, 122.70, 31.01, 10.84 |
| A-6 | 1.92 (t), 1.42 (m), 0.80 (t) | 182.79, 122.70, 40.09, 19.39, 14.06 |
| A-7 | 2.16 (sept), 0.92 (d) | 186.96, 123.04, 36.12, 20.42 (2C) |
| A-8 | 0.97 (s) | 188.22, 123.49, 38.85, 28.64 (3C) |
| A-9 | 1.91 (t, 2H), 1.40 (m, 2H), 1.24-1.17 (m, 4H), 0.83 (t, 3H) | 182.80, 122.68, 38.03, 31.32, 25.81, 22.09, 13.98 |
| A-10 | 1.90 (t, 2H), 1.39 (m, 2H), 1.24-1.19 (m, 16H), 0.84 (t, 3H) | 182.63, 122.66, 38.08, 31.32, 29.10-29.06 (5C), 28.74, 26.14, 22.11, 13.95 |
| A-11 | 5.30 (m, 2H), 1.97 (m, 4H), 1.89 (t, 2H), 1.38 (m, 2H), 1.29-1.22 (m, 20H), 0.83 (t, 3H) | 182.49, 129.74, 129.60, 122.63, 31.30, 30.91,29.18-28.60 (8C), 26.68, 26.61, 26.14, 22.10, 13.93 |
| A-12 | 7.24-7.20(m, 4H), 7.14 (m, 1H), 3.25 (s, 2H) | 180.57, 138.49, 129.19 (2C), 127.82 (2C), 125.61, 122.39, 45.30 |
| A-13 | 7.79 (d, 2H), 7.09 (d, 2H), 2.28 (s, 3H) | 174.85, 139.38, 135.81, 128.23 (2C), 128.04 (2C), 123.00, 20.97 |
| A-14 | 2.10 (t, 4H) | 182.91 (2C), 122.61 (2C), 34.92 (2C) |
| A-15 | 1.89 (m, 4H), 1.35 (m, 4H) | 182.85 (2C), 122.68 (2C), 38.07 (2C), 26.16 (2C) |

Examples Concentrate Production

Example B-1

Sodium Acetylcyanamide as Aqueous Solution With Surfactant 250 g sodium acetylcyanamide from Example A-1 was dissolved in 600 g water, to which 2.4 g of the nonionic surfactant BreakThru® OE-446 (manufacturer Evonik) was added and the mixture was filled up to a total of 1000 g with water. A clear solution was obtained.

Example B-1a

Sodium Acetylcyanamide as Emulsifiable Solution in Ethanol/Water/Biodiesel/Surfactant 200 g sodium acetylcyanamide from Example A-1 were dissolved in 600 g of a mixture of 80 wt. % ethanol and 20 wt. % water. 50 g of rapeseed oil methyl ester, 2.4 g of the nonionic surfactant BreakThru® S-240 (manufacturer Evonik) and 20 mg of the dye Iragon Blue ABL9-L (manufacturer BASF) were added. The mixture was filled up to 1000 g with ethanol/water. A slightly blue colored, clear solution was obtained, which was easily emulsifiable in water.

Example B-1b

Potassium Acetylcyanamide as a Solid 100 g potassium acetylcyanamide from Example A-1c was finely ground with 1 g sodium dodecyl sulfate and 100 g anhydrous sodium sulfate. A white solid was obtained which was readily soluble in water, with slight foaming.

Example B-2

Sodium Formylcyanamide as Aqueous Solution With Surfactant 250 g sodium formylcyanamide from Example A-2 was dissolved in 500 g water, to which 2.4 g of the nonionic surfactant BreakThru® OE-446 and 20 mg of the dye Iragon Blue ABL9-L were added and filled up to 1000 g with water. A clear, blue colored concentrate solution was obtained.

Example B-3

Sodium Propionylcyanamide as Aqueous Solution With Surfactant 250 g sodium propionylcyanamide from Example A-2 was dissolved in 500 g water, to which 2.4 g of the nonionic surfactant BreakThru® OE-446 and 20 mg of the dye Iragon Blue ABL9-L were added and filled up to 1000 g with water. A clear, blue colored concentrate solution was obtained.

Reference Example B-16

Preparation of a Concentrate Containing Cyanamide 400 g pure cyanamide was dissolved in 600 g water. The pH value was adjusted to 4.2 with about 0.1 g phosphoric acid. 10 g BreakThru® OE446 and 20 mg Iragon Blue ABL9-L were added. A blue colored concentrate solution B-16 was obtained.

Storage Stability of Concentrate Solutions B-1, B-2 and B-3 in Comparison with B-16 (Reference)

The concentrate solutions from B-1, B-2, B-3 and the cyanamide-containing reference solution B-16 were set up at 60° C. and samples were taken after different periods of time in each case. These were analyzed immediately by ion chromatography for their content of acylcyanamides and cyanamide, respectively. The respective starting solution stored at −18° C. served as a reference. In each case, the content was assigned to 100%, and the decrease in concentration was determined in relation to this.

TABLE 3

| Storage stability | | | | |
|---|---|---|---|---|
| Concentrate | B-1 | B-2 | B-3 | B-16 |
| freshly prepared | 100% | 100% | 100% | 100% |
| after 1 day at 60° C. | 99.9% | 81.6% | 99.5% | 98.6% |
| after 2 days at 60° C. | 99.5% | 66.8% | 99.3% | 97.4% |
| after 4 days at 60° C. | 99.3% | 41.7% | 98.1% | 90.0% |
| after 7 days at 60° C. | 98.3% | <30% | 97.5% | 46.4% |
| after 14 days at 60° C. | 95.0% | <30% | 96.6% | <30% |

The result shows that the solutions of sodium acetylcyanamide (B-1) and sodium propionylcyanamide (B-3) have a much better shelf life and thus a better storability than the concentrate solution of cyanamide (B-16) corresponding to the prior art. This is of decisive advantage for handling in agriculture.

Examples Greenhouse Tests

Greenhouse tests were conducted using cut fruit tree branches placed in water jars and maintained under controlled conditions with temperature regulation at approximately 22° C. and natural lighting.

Branches of the following species fruit trees were used:

C1: Table Apple, Type Boiken Apple

Table apple: *Malus domestica* type Boiken first described in 1828 in Bremen after Deichvogt Boiken. Apple type for rough locations and for almost every soil suitable scattered fruit type, whereby heavy soils and not too warm locations are required. Tree growth initially strong, later medium. Older crowns become broadly spherical and are loosely branched. Flowering starting medium-late and long lasting, petals large with little pink. Yield starting late (October) and irregular; with long shelf life and pressure resistance. The type shows low respiration in storage and gains quality as it matures.

C2: Table Apple, Type Zabergäu-Renette

Table apple: *Malus domestica* type Zabergäu-Renette first developed in 1885 as a chance seedling in Hausen a.d. Zaber/Baden-Württemberg and initially grown as 'Hausener Graue Renettte'. No defined storage type; requires heavy soils (loam). Tree growth initially strong with oblique upright leading branches, later medium with flat branches. Crown broad and flat-spherical with flat fruiting wood. Leaves large, broad oval and with clearly separated tip. Triploid type with late and long-lasting flowering. Yield starting early, medium high and somewhat alternate.

C3: Table Cherry, Type Burlat

Table cherry: *Prunus avium* type Bigarreau Burlat or Hativ Burlat is a strong-growing somewhat sparse growing sweet cherry tree with horizontal side sprouts. The type has been known since 1930 and is one of the most important types in commercial cultivation. Flowering is early, followed by an early ripening week (end of May 2nd cherry type) and yield starting late. Medium but regular yields identify the type as a secondary type for early and dry areas.

C4: Grape, Type Pinot Noir

Grape: *Vitis vinifera* subsp. *vinifera* type Pinot Noir is an important and high quality red wine type that has existed for possibly 2000 years. It is cultivated all over the world because the type produces high quality red wines and has sufficient winter frost resistance. The type requires early and good areas with deep, warm, medium-heavy and fertile soils with good water supply. Pinot Noir produces regular, medium-high to high yields. However, there are a large number of clones that differ in yield, berry size and looseness.

Branches or sprouts were pruned in November, approximately 1 week after the last leaf fall but before the first night frost. Branch cuttings were brought to equal length, divided into groups of 5 branches each, so that a uniform number of buds and sprout shape per group was achieved.

The test solutions were prepared directly, i.e. without intermediate preparation of a concentrate. For each of the test substances A-1 to A-13, an aqueous solution of 0.15 mol of the test substance and 0.15 g BreakThru® OE-446 was prepared and filled up to a total of 500 g with water. Of bis-cyanamides A-14 and A-15, 0.075 mol each was filled up to 500 g in an analogous manner. These test solutions (in combination with the above 4 species/types Cx) were given the test numbers Cx-A1 to Cx-A15.

Reference solutions for negative and positive control, respectively, were:

Cx-0: 500 g pure water (negative control)

Cx-0a: 0.15 g BreakThru® OE-446, filled up to 500 g with pure water (negative control)

Cx-16: 0.15 mol (6.30 g) pure cyanamide and 0.15 g BreakThru® OE-446 filled up to 500 g with water (positive control)

The test solutions (15 test solutions) were each placed in a photo dish, the 5 each branches were dipped in the solution, additionally wetted with a brush as necessary, so that the entire surface was wetted. The branches were placed on filter paper so that excess liquid could drip off and allowed to dry for 20 minutes. Then, the 5 respectively uniformly treated branches were placed in a jar of pure water and set up in the greenhouse as described above.

After specified evaluation times T1 to T6 (after 14, 16, 21, 27, 36 and 56 days, respectively, each determined after application of the test solution "day 0"), the bud development of each test group was evaluated. This was done with the following evaluation scale:

Stage 0: Buds unchanged

Stage 1: Buds slightly swollen, first green tips visible

Stage 2: strongly swollen, green buds

Stage 3: Buds before breaking open, leaf or flower root already visible

Stage 4: Flower buds fully developed, but still closed, white petals already visible. In the case of the grapevine, stage 4 was the unfolding of the first leaves Stage 5: Flowers fully open or, in the case of grapevine, unfolding of the flower roots ("Gescheine") on the fully leafed sprouts.

Evaluation of the Tests

A dormancy-breaking effect is present if, depending on the species under investigation (fruit tree), evaluation stage 4 is reached or exceeded after a number of n days (depending on the species (fruit tree)) in comparison with the negative control (water or water with surfactant). The greater the difference in time and/or the evaluation stage compared to the negative control, the better the dormancy-breaking effect is to be classified.

n (for C1, C2, C4): 36 days n (for C3): 27 days

A good dormancy-breaking effect exists if, depending on the species under investigation (fruit tree), evaluation stage 4 is reached or exceeded after a number of n days (depending on the species (fruit tree)) in comparison with the negative control (water or water with surfactant). The greater the difference in time and/or the evaluation stage compared to the negative control, the better the dormancy-breaking effect is to be classified.

n (for C1, C2, C4): 27 days n (for C3): 21 days

TABLE 3

Results of apple branches C1 at evaluation times T1 to T6:

| | T1/(14 d) | T2/(16 d) | T3/(21 d) | T4/(27 d) | T5/(36 d) | T6/(56 d) |
|---|---|---|---|---|---|---|
| C1-0 | 0 | 0 | 0 | 1 | 1 | 1 |
| C1-0a | 0 | 0 | 0 | 1 | 1 | 1 |
| C1-A1 | 0 | 0 | 2 | 3 | 5 | 5 |
| C1-A2 | 0 | 0 | 4 | 5 | 5 | 5 |
| C1-A3 | 1 | 1 | 2 | 3 | 4 | 5 |
| C1-A4 | 1 | 1 | 1 | 2 | 3 | 4 |
| C1-A5 | 2 | 2 | 4 | 5 | 5 | 5 |

TABLE 3-continued

Results of apple branches C1 at evaluation times T1 to T6:

| | T1/(14 d) | T2/(16 d) | T3/(21 d) | T4/(27 d) | T5/(36 d) | T6/(56 d) |
|---|---|---|---|---|---|---|
| C1-A6 | 2 | 3 | 4 | 5 | 5 | 5 |
| C1-A7 | 2 | 3 | 4 | 5 | 5 | 5 |
| C1-A8 | 0 | 0 | 2 | 4 | 4 | 4 |
| C1-A9 | 0 | 1 | 1 | 2 | 2 | 3 |
| C1-A10 | 1 | 2 | 4 | 5 | 5 | 5 |
| C1-A11 | 0 | 1 | 2 | 3 | 5 | 5 |
| C1-A12 | 0 | 1 | 2 | 2 | 5 | 5 |
| C1-A13 | 0 | 0 | 0 | 1 | 4 | 4 |
| C1-A14 | 1 | 1 | 2 | 3 | 5 | 5 |
| C1-A15 | 0 | 0 | 1 | 2 | 3 | 4 |
| C1-16 | 3 | 4 | 5 | 5 | 5 | 5 |

The test results show that 12 (80%) of the investigated substances have a dormancy-breaking effect according to the definition given above (cf. A1, A2, A3, A5, A6, A7, A8, A10, A11, A12, A13, A14). 6 (40%) of the investigated substances even show a good to very good dormancy-breaking effect on the investigated species (cf. A2, A5, A6, A7, A8, A10).

TABLE 4

Results of apple branches C2 at evaluation times T1 to T6

| | T1/(14 d) | T2/(16 d) | T3/(21 d) | T4/(27 d) | T5/(36 d) | T6/(56 d) |
|---|---|---|---|---|---|---|
| C2-0 | 0 | 0 | 0 | 0 | 0 | 0 |
| C2-0a | 0 | 0 | 0 | 1 | 2 | 3 |
| C2-A1 | 0 | 0 | 1 | 3 | 5 | 5 |
| C2-A2 | 0 | 0 | 1 | 3 | 5 | 5 |
| C2-A3 | 0 | 0 | 0 | 2 | 4 | 4 |
| C2-A4 | 0 | 0 | 0 | 1 | 2 | 2 |
| C2-A5 | 0 | 0 | 0 | 1 | 3 | 4 |
| C2-A6 | 0 | 0 | 1 | 2 | 5 | 5 |
| C2-A7 | 0 | 0 | 1 | 1 | 5 | 5 |
| C2-A8 | 0 | 0 | 0 | 1 | 2 | 4 |
| C2-A9 | 0 | 1 | 4 | 5 | 5 | 5 |
| C2-A10 | 0 | 0 | 0 | 1 | 2 | 4 |
| C2-A11 | 0 | 0 | 3 | 3 | 4 | 5 |
| C2-A12 | 0 | 0 | 3 | 3 | 4 | 5 |
| C2-A13 | 0 | 0 | 1 | 3 | 3 | 5 |
| C2-A14 | 0 | 0 | 0 | 1 | 3 | 4 |
| C2-A15 | 0 | 0 | 1 | 5 | 5 | 5 |
| C2-16 | 0 | 0 | 3 | 4 | 5 | 5 |

The test results show that 9 (60%) of the investigated substances have a dormancy-breaking effect according to the definition given above (cf. A1, A2, A3, A6, A7, A9, A11, A12, A15). 2 (13%) of the investigated substances even show a good to very good dormancy-breaking effect on the investigated species (cf. A9, A15).

Overall Result Apple (C1, C2)

Depending on the apple type tested, 14 of the 15 substances tested showed a dormancy-breaking effect in at least one apple type. Particularly emphasized are substances A6, A7, A9 and A15, which showed a similar or equally good effect compared to the positive control.

TABLE 5

Results of cherry branches C3 at evaluation times T1 to T6

| | T1/(14 d) | T2/(16 d) | T3/(21 d) | T4/(27 d) | T5/(36 d) | T6/(56 d) |
|---|---|---|---|---|---|---|
| C3-0 | 0 | 0 | 0 | 0 | 1 | 5 |
| C3-0a | 0 | 0 | 0 | 0 | 0 | 3 |
| C3-A1 | 1 | 2 | 5 | 5 | 5 | 5 |

TABLE 5-continued

| Results of cherry branches C3 at evaluation times T1 to T6 | | | | | | |
|---|---|---|---|---|---|---|
| | T1/(14 d) | T2/(16 d) | T3/(21 d) | T4/(27 d) | T5/(36 d) | T6/(56 d) |
| C3-A2 | 1 | 2 | 5 | 5 | 5 | 5 |
| C3-A3 | 0 | 0 | 0 | 1 | 3 | 5 |
| C3-A4 | 1 | 2 | 4 | 4 | 5 | 5 |
| C3-A5 | 1 | 2 | 4 | 4 | 4 | 5 |
| C3-A6 | 1 | 1 | 3 | 5 | 5 | 5 |
| C3-A7 | 0 | 0 | 1 | 2 | 4 | 5 |
| C3-A8 | 0 | 0 | 1 | 2 | 4 | 5 |
| C3-A9 | 0 | 1 | 2 | 3 | 5 | 5 |
| C3-A10 | 1 | 2 | 4 | 4 | 4 | 5 |
| C3-A11 | 2 | 3 | 5 | 5 | 5 | 5 |
| C3-A12 | 0 | 1 | 2 | 5 | 5 | 5 |
| C3-A13 | 0 | 0 | 0 | 1 | 2 | 5 |
| C3-A14 | 0 | 1 | 4 | 5 | 5 | 5 |
| C3-A15 | 0 | 1 | 1 | 1 | 2 | 4 |
| C3-16 | 2 | 4 | 5 | 5 | 5 | 5 |

The test results show that 9 (60%) of the investigated substances have a dormancy-breaking effect according to the definition given above (cf. A1, A2, A4, A5, A6, A10, A11, A12, A14). 7 (47%) of the investigated substances even show a good to very good dormancy-breaking effect on the investigated species cherry (cf. A1, A2, A4, A5, A10, A11, A14). In contrast to the apple species (C1, C2), substance A4 has a good dormancy-breaking effect on the cherry species. It should also be emphasized in this regard that substance A11 exhibits an equal effect with that of cyanamide.

TABLE 6

| Results of wine sprouts C4 at evaluation times T1 to T6 | | | | | | |
|---|---|---|---|---|---|---|
| | T1/(14 d) | T2/(16 d) | T3/(21 d) | T4/(27 d) | T5/(36 d) | T6/(56 d) |
| C4-0 | 0 | 0 | 0 | 0 | 2 | 5 |
| C4-0a | 0 | 0 | 0 | 0 | 1 | 5 |
| C4-A1 | 0 | 0 | 0 | 1 | 4 | 5 |
| C4-A2 | 0 | 1 | 3 | 5 | 5 | 5 |
| C4-A3 | 0 | 0 | 0 | 1 | 5 | 5 |
| C4-A4 | 0 | 0 | 0 | 3 | 5 | 5 |
| C4-A5 | 0 | 0 | 0 | 1 | 3 | 5 |
| C4-A6 | 0 | 0 | 0 | 1 | 2 | 5 |
| C4-A7 | 0 | 0 | 0 | 2 | 5 | 5 |
| C4-A8 | 0 | 0 | 0 | 1 | 4 | 5 |
| C4-A9 | 0 | 0 | 0 | 2 | 5 | 5 |
| C4-A10 | 0 | 0 | 0 | 1 | 2 | 4 |
| C4-A11 | 0 | 0 | 1 | 3 | 4 | 5 |
| C4-A12 | 0 | 0 | 1 | 3 | 4 | 4 |
| C4-A13 | 0 | 0 | 0 | 1 | 3 | 5 |
| C4-A14 | 0 | 0 | 0 | 2 | 4 | 4 |
| C4-A15 | 0 | 0 | 0 | 1 | 4 | 5 |
| C4-16 | 0 | 0 | 2 | 5 | 5 | 5 |

The test results show that 11 (73%) of the investigated substances have a dormancy-breaking effect according to the definition given above (cf. A1, A2, A3, A4, A7, A8, A9, A11, A12, A14, A15). 1 (7%) of the investigated substances even show a good to very good dormancy-breaking effect on the investigated species wine (cf. A2). It should be emphasized in this regard that substance A2 exhibits an equal effect with cyanamide.

Overall Result

A compilation of the results on the four fruit tree species C1 to C4 shows that sodium acylcyanamides A1 to A15 according to the invention all exhibit a more or less strong dormancy-breaking effect compared with the water reference (negative control). The effect is similar, but in some cases somewhat weaker or slightly delayed compared with the positive reference cyanamide (=standard agent according to prior art), the efficiency of which is achieved in some cases depending on the species.

Examples for the Production of Spray Mixtures from Concentrates

Example D-1

Preparation of a Spray Mixture Containing Sodium Acetylcyanamide 10 parts of the concentrate solution from Example B-1 were diluted with 90 parts of water. A water-clear solution was obtained, which was used as a spray mixture. The spray mixture contained about 0.24 mol of the active ingredient acetylcyanamide per liter.

Example D-1a

Preparation of a Spray Mixture-Emulsion Containing Sodium Acetylcyanamide 8 parts of the concentrate solution from Example B-1a were added to 92 parts of water. The two components mixed to form a bluish colored, slightly turbid emulsion. The spray mixture contained about 0.15 mol acetylcyanamide per liter.

Reference Example D-18

Preparation of a Spray Mixture Containing Cyanamide 2.5 parts of the concentrate solution from Example B-18 were mixed with 97.5 parts of water to obtain the reference spray mixture D-18. The spray mixture contained about 0.24 mol of the active ingredient cyanamide per liter.

Field Tests

Example E1

Table Grapes USA

Three sections of a commercial table grape plantation near Madera State of California were treated with the following spray mixtures during the dormancy phase 45 days prior to natural bud burst (February 11):

E1-0: 600 liters per hectare of water with an addition of 0.1% Break-Thru® OE-446

E1-1: 600 liters per hectare of the spray mixture from example D-1

E1-18: 600 liters per hectare of the spray mixture from example D-18

As a result, the grapevine sprouts were evenly wetted.

Bud burst was recorded numerically on the 30th and 41st day after application.

Budding means number of buds that have developed at least one leaf after n days, based on the total number of buds on the sprouts at time n=0 days (day of application of spray mixture).

TABLE 7

| Results table grapes USA | | |
|---|---|---|
| | 30 days | 41 days |
| E1-0 (zero reference) | 42.5% budding | 76.3% budding |
| E1-1 (invention) | 50.5% budding | 74.0% budding |
| E1-18 (comparison) | 55.8% budding | 77.5% budding |

After 30 days, budding was significantly premature due to the treatment, wherein the E1-1 treatment according to the invention was not quite as effective as the prior art with cyanamide (E1-18). Due to the specific weather conditions, after 41 days, the advantage provided by both active ingredient treatments had been eroded.

Example E2

Table Grapes Spain

Three sections of a table grape plantation in southern Spain (type Red Globe) were treated with the following spray mixtures during the dormancy phase 45 days before natural bud burst (February 5):

E2-0: 600 liters per hectare of water with an addition of 0.1% Break-Thru® OE-446

E2-1: 600 liters per hectare of the spray mixture from example D-1

E2-18: 600 liters per hectare of the spray mixture from example D-18

As a result, the grapevine sprouts were evenly wetted.

On April 3, bud burst was recorded numerically.

Budding means number of buds that have developed at least one leaf after n days, based on the total number of buds on the sprouts at time n=0 days (day of application of spray mixture).

TABLE 8

| Results table grapes Spain | |
|---|---|
| E2-0 (zero reference) | 73.8% budding |
| E2-1 (invention) | 86.7% budding |
| E2-18 (comparison) | 86.0% budding |

Thus, the treatment with sodium acetylcyanamide according to the invention is as effective as the prior art treatment with cyanamide.

Example E3

Table Grapes India

Three sections of a table grape plantation in India with types Bordon AR and Hammar AR were treated with the following spray mixtures during the dormancy phase:

E3-0: 600 liters per hectare of water with an addition of 0.1% Break-Thru® OE-446

E3-1: 600 liters per hectare of the spray mixture from example D-1

E3-18: 600 liters per hectare of the spray mixture from example D-18

As a result, the grapevine sprouts were evenly wetted.

After 30 and 45 days, respectively, bud burst was recorded numerically.

Budding means number of buds that have developed at least one leaf after n days, based on the total number of buds on the sprouts at time n=0 days (day of application of spray mixture).

TABLE 9

Results table grapes India

| | Type Bordon AR | | Type HammarAR | |
|---|---|---|---|---|
| Evaluation time | 30 days | 45 days | 30 days | 45 days |
| E3-0 (zero reference) | 33.1% budding | 58.6% budding | 10.0% budding | 71.2% budding |
| E3-1 (invention) | 36.6% budding | 66.8% budding | 18.0% budding | 81.3% budding |
| E3-18 (comparison) | 36.1% budding | 68.1% budding | 15.3% budding | 81.0% budding |

Thus, the treatment with sodium acetylcyanamide according to the invention is at least as effective as the prior art treatment with cyanamide.

The invention claimed is:

1. A method for regulating generative growth of plants or for breaking dormancy of fruit trees comprising application by dipping, brushing or spraying of branches, sprouts or buds of the plants with an aqueous solution comprising at least one active ingredient from a group of acylcyanamides or a salt thereof according to formula (I) or formula (II), during dormancy of the plants, wherein the following applies to formula (I) and formula (II)

Formula (I)

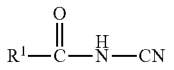

Formula (II)

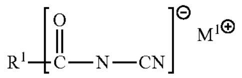

wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV)

Formula (III)

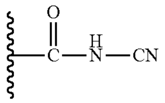

Formula (IV)

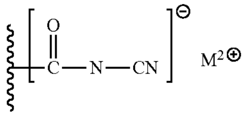

$M^1$, $M^2$=independently of one another Li, Na, K, ½ Ca, ½ Mg, or $NR^2R^3R^4R^5$, $R^2$, $R^3$, $R^4$, $R^5$ =independently of one another hydrogen or $C_1$ to $C_{20}$ alkyl.

2. The method according to claim 1, characterized in that at least one compound from the group of acylcyanamides or a salt thereof according to formula (I) or formula (II) is used, wherein radicals $R^1$, $R^2$, $R^3$, $R^4$, $R^5$ and cations $M^1$, $M^2$ independently of one another mean:

$R^1$=hydrogen, $C_1$ to $C_{20}$ alkyl, $C_3$ to $C_{12}$ cycloalkyl, $C_2$ to $C_{20}$ alkenyl, $C_1$ to $C_{20}$ alkoxy or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, each substituted by a radical of formula (III) or formula (IV), $M^1$, $M^2$=independently of one another Li, Na, K, ½ Ca, ½ Mg, or $NR^2R^3R^4R^5$, $R^2$, $R^3$, $R^4$, $R^5$ =independently of one another hydrogen or $C_1$ to $C_{20}$ alkyl.

3. The method according to claim 1, characterized in that at least one compound from the group of acylcyanamides or a salt thereof according to formula (I) or formula (II) is used, wherein radicals $R^1$, $R^2$, $R^3$, $R^4$, $R^5$ and cations $M^1$, $M^2$ independently of one another mean:

$R^1$=aryl, alkylaryl or arylalkyl, or a radical Q, wherein Q is:

Q=aryl, alkylaryl or arylalkyl, each substituted by a radical of formula (III) or formula (IV), $M^1$, $M^2$=independently of one another Li, Na, K, ½ Ca, ½ Mg, or $NR^2R^3R^4R^5$, $R^2$, $R^3$, $R^4$, $R^5$=independently of one another hydrogen or $C_1$ to $C_{20}$ alkyl.

4. The method according to claim 1, characterized in that at least one compound from the group of acylcyanamides or a salt thereof according to formula (I) or formula (II) is used, wherein radical $R^1$ and cations $M^1$, $M^2$ independently of one another mean:

$R^1$=hydrogen, methyl, ethyl, n-propyl, 1-methylethyl, n-butyl, 1-methylpropyl, 2-methylpropyl, n-pentyl, n-hexyl, n-heptyl, n-octyl or a radical Q, wherein Q is:

Q=methyl, ethyl, n-propyl, 1-methylethyl, n-butyl, 1-methylpropyl, 2-methylpropyl, n-pentyl, n-hexyl, n-heptyl, n-octyl, each substituted by a radical of formula (III) or formula (IV), $M^1$, $M^2$=independently of one another Na or K.

5. The method according to claim 1, characterized in that at least one compound selected from the group consisting of sodium formylcyanamide, sodium acetylcyanamide, sodium propionylcyanamide, sodium n-butyrylcyanamide, sodium isobutyrylcyanamide, sodium methoxycarbonylcyanamide, sodium ethoxycarbonylcyanamide, potassium formylcyanamide, potassium acetylcyanamide, potassium propionylcyanamide, potassium n-butyrylcyanamide, potassium isobutyrylcyanamide, potassium methoxycarbonylcyanamide and potassium ethoxycarbonylcyanamide is used.

6. The method according to claim 1, characterized in that as plants, as crops and cultivated plants or as fruit trees, plants selected from the group consisting of grape (*Vitis vinifera*), kiwi (*Actinidia deliciosa, Actinidia chinensis*, or *Actinidia arguta*), blueberry (*Vaccinium myrtillus, Vaccinium corymbosum, Vaccinium virgatum, Vaccinium angustifolium* or *Vaccinium myrtilloides*), cherry (*Prunus avium* or *Prunus cerasus*), plum or damson (*Prunus domestica*), apple (*Malus domestica* or *Malus orientalis*), pear (*Pyrus communis, Pyrus pyraster* or *Pyrus pyrifolia*), quince (*Cydonia oblonga*), peach (*Prunus persica*), apricot (*Prunus armeniaca*), raspberry (*Rubus idaeus*), persimmon (*Diospyrus kaki*), fig (*Ficus carica*) and their cross products or cultivars are treated.

7. A method for regulating generative growth of plants or for breaking dormancy of fruit trees comprising application of at least one compound from the group of acylcyanamides or a salt thereof according to formula (I) or formula (II), wherein the following applies to formula (I) and formula (II)

Formula (I)

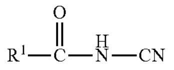

Formula (II)

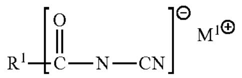

wherein radicals $R^1$, $R^2$, $R^3$, $R^4$, $R^5$ and cations $M^1$, $M^2$ independently of one another mean:

$R^1$=hydrogen, $C^1$ to $C^{20}$ alkyl, $C^3$ to $C^{12}$ cycloalkyl, $C^2$ to $C^{20}$ alkenyl, $C_1$ to $C_{20}$ alkoxy, aryl, alkylaryl or arylalkyl, or a radical Q, wherein Q is:

Q=$C_1$ to $C_{20}$ alkyl, $C_3$ to $C_{12}$ cycloalkyl, $C_2$ to $C_{20}$ alkenyl, $C_1$ to $C_{20}$ alkoxy, aryl, alkylaryl or arylalkyl, each substituted by a radical of formula (III) or formula (IV)

Formula (III)

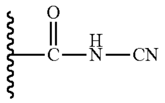

Formula (IV)

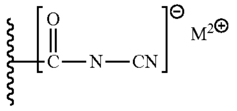

$M^1$, $M^2$ =independently of one another Li, Na, K, ½ Ca, ½ Mg, or $NR^2R^3R^4R^5$, $R^2$, $R^3$, $R^4$, $R^5$ =independently of one another hydrogen or $C_1$ to $C_{20}$ alkyl.

* * * * *